S. H. MARTIN.
SYNCHRONOUS DYNAMO ELECTRIC MACHINE.
APPLICATION FILED JUNE 2, 1913.

1,226,901.

Patented May 22, 1917.
2 SHEETS—SHEET 2.

UNITED STATES PATENT OFFICE.

SAMUEL H. MARTIN, OF CHICAGO, ILLINOIS.

SYNCHRONOUS DYNAMO-ELECTRIC MACHINE.

1,226,901.

Specification of Letters Patent.

Patented May 22, 1917.

Application filed June 2, 1913. Serial No. 771,172.

*To all whom it may concern:*

Be it known that I, SAMUEL H. MARTIN, a citizen of the United States of America, and a resident of Chicago, county of Cook, and State of Illinois, have invented certain new and useful Improvements in Synchronous Dynamo-Electric Machines, of which the following is a specification.

This invention relates to improvements in dynamo electric machines, and more particularly to machines of this class adapted for motor service and also for the conversion of single or polyphase alternating current into direct current and vice versa.

The main objects of this invention are to provide an improved construction and arrangement of circuits for motors of the character described, adapted to operate efficiently on single or polyphase alternating current; to provide circuit means in the machines for controlling the starting of machines made in accordance with this invention upon due setting of the current supply switch; to provide and arrange regulating windings both in the field and line circuits and also independently thereof for better regulation of speed; to provide an improved form of magnetic screen with windings disposed thereon adapted to most effectively distribute and control the field flux in starting and when operating under various conditions of load and no load, and especially to suppress line surges and prevent hunting; to provide supplementary field windings of substantially the same low self-inductance and resistance as the armature, to facilitate starting with a considerable degree of torque and a high power factor; to provide means for changing the circuit connections by a simple operation from starting to running conditions, as for switching certain field exciting coils to operate on alternating current in starting, and to serve as an electric damper when full speed is attained; to arrange the circuits to deliver direct current through the starting leads and switch contacts when the machine is operating normally; and to so construct a machine of this character as to permit of its being operated either as a motor or as a rotary converter.

A specific construction embodying this invention is illustrated in the accompanying drawings in which.

Figure 1:
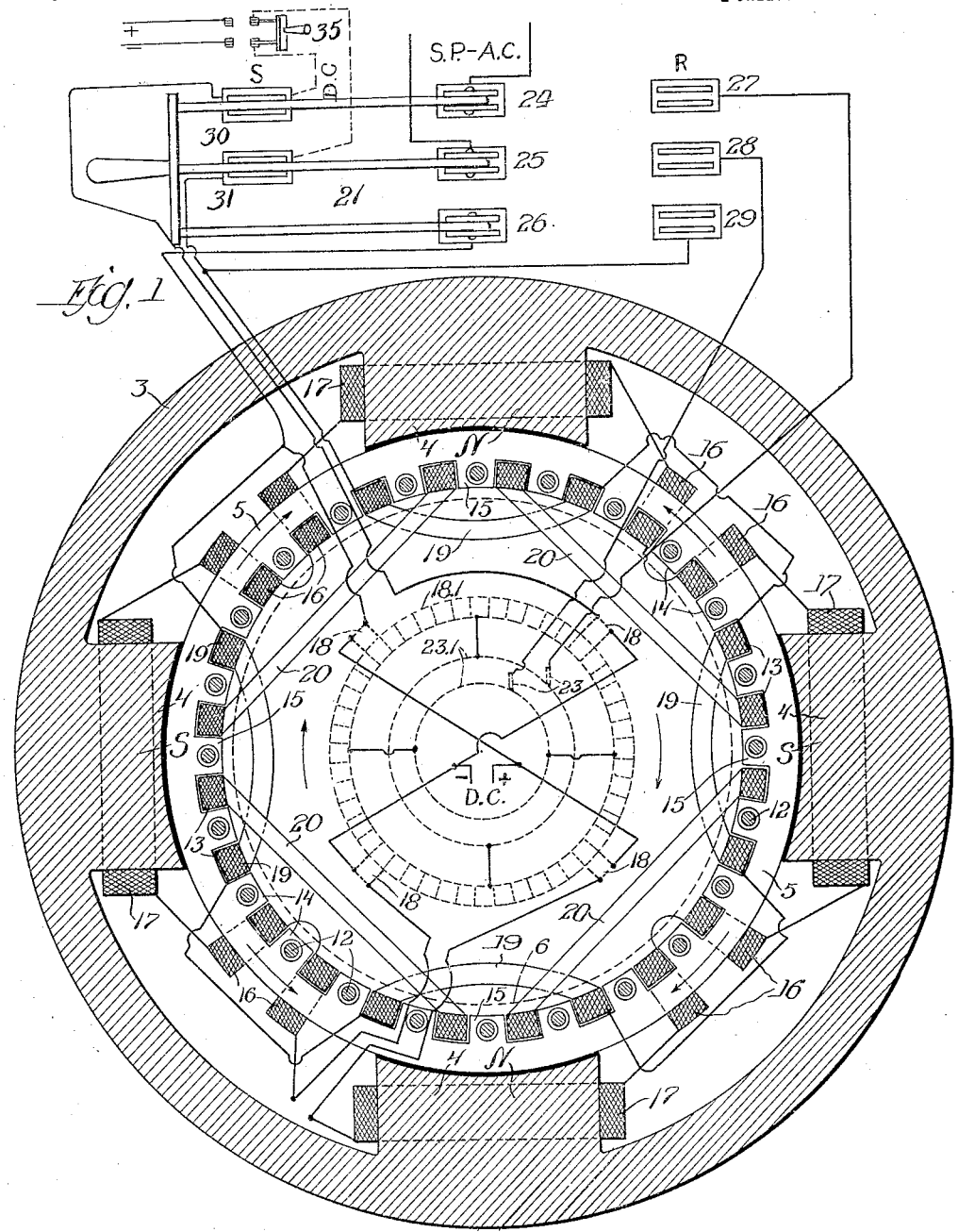
Figure 1 is a transverse central section of the machine showing the relative position of the main poles, armature, screen, and the several windings, the armature and brushes being indicated by dotted lines, and the electrical connections being shown diagrammatically.

In the construction shown in the drawings, the stationary frame of the machine is formed to include a magnetic field member, arranged in the form of a closed peripheral yoke 3, having poles 4 symmetrically disposed in pairs and projecting inwardly therefrom in radial position, in combination with a closed ring member 5 rigidly embraced by the inner faces of the said poles and supported thereby. The armature 6 is journaled concentrically in the said frame to rotate within said ring with a small air gap between the outer surface of the armature and the ring.

The said ring is constructed to consist of a laminated core comprising thin layers or sheets 9 of annealed soft iron radially disposed and held pressed closely together between heavy rings or plates 10 disposed on opposite sides, said plates being permanently clamped together by means of a plurality of heavy bolts or bars 12 adapted for setting up or riveting to bind the parts together substantially integrally, the said lamination sheets constituting a magnetic screen element proper, and the said clamping plates and bars, both consisting of brass, copper, or other good current conducting material, constituting substantially a squirrel cage damper.

The said ring is provided with an inner peripheral series of transversely disposed slots 13, symmetrically arranged for housing the starting and other supplementary coils to be described. By this construction the ring constitutes substantially a slotted housing with inwardly projecting teeth 14 separated by the said slots.

The said teeth are perforated transversely of the ring to receive and house the said clamping bars 12 which hold the parts of the ring together, and to provide for disposing the induction members of the squirrel cage damper closely adjacent to the inner surface of the screen ring, and in close proximity to the armature where their influence is most efficient for steadying the magnetic flux and preventing pulsations thereof.

In the construction shown in Fig. 1 there are twenty-four slots and twenty-four teeth, four of the teeth 15 disposed in quadrature being in axial alinement with the adjacent poles respectively, thus providing six slots between each two adjacent main poles. Of these slots the middle two are occupied by ring windings 16 connected in series with the main field coils 17 across the direct current brushes 18, and the adjacent slots, one on each side, are occupied each by one side of the adjacent main field supplementary coils 19 respectively, and the two remaining slots, one on each side and adjacent to the polar axial teeth 15, are occupied by one of the short circuited damping coils 20 which are adapted and arranged to coöperate with the said squirrel cage damper to further steady the magnetic flux. The disposition of the effective parts of these coils 20 directly opposite the main pole faces renders them especially efficient as supplementary damper windings.

The direct current brushes are disposed in quadrature on the commutator 18.1 and alternate brushes are connected in pairs of like polarity.

The said supplementary or starting field coils 19 and damper coils 20 may be and preferably are form wound coils, the former each consisting of a medium or moderate number of turns of medium sized wire and the latter a very few turns of a large conductor; said coils all being adapted to slip into place in their respective slots before the armature is put in place.

The said ring wound coils 16 consist each of many turns of fine wire corresponding with that of the main field coils 17 with which they are connected in series.

The field exciting coils 17 and 19 are connected to supplement each other in building up main pole fluxes of alternating polarity in starting, and the ring wound coils 16 are connected to oppose leakage through the screen at all times and to increase the strength of the main poles. When full speed is attained the coils 19 are short circuited in series to serve as a damper.

The normal working polarity of the main poles is indicated by the letters N and S on Fig. 1. The magnetic flux induced by the ring wound coils 16 is indicated by the arrows, associated therewith. In starting the motor on alternating current the effect of the coils 16 is small but the flux induced by the supplementary windings 19 largely follows the same course and is assisted somewhat by the coils 16.

A three pole double throw line switch 21 with one contact on the starting side omitted is connected to lead the alternating power current through the supplementary field coils 19 and armature winding 22 in starting, and to switch over to lead the power current directly to the alternating current brushes 23 on the slip ring 23.1 and to short circuit the coils 19 when the machine has come up to speed. The said switch 21 comprises three central or hinge contacts 24, 25 and 26, three contacts 27, 28 and 29 on the running side indicated by R, and two contacts 30 and 31 on the starting side indicated by S.

The switch contacts 26 and 29 are connected permanently to one of the direct current brushes 18 and adjacently connected coil 19 on one side of the starting field coils 19, and to the switch contact 31 and adjacently connected coil 19 on the opposite side of the starting field coils 19 respectively, so as to connect the said coils 19 in series with the armature in starting and so as to short circuit them when the switch 21 is thrown to its running position.

When the switch 21 is thrown to its starting position, the circuit is closed through the elements indicated by the following numerals taken in order:

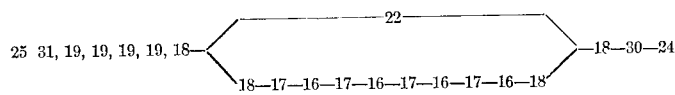

When the circuit is connected thus the greater part of the current is shunted through the armature 22 rather than through the field coils 16 and 17, which have relatively high ohmic resistance as well as self inductance.

When the switch 21 is thrown to its running position the alternating current is closed through the elements indicated by the following numerals taken in order: 25—28—23—23.1—22—23.1—23—27—24; and the starting field coils 19 are short circuited in series through the switch contacts 26 and 29, thus converting them into an electrical damper which will assist the other damper elements herein referred to, to steady the field. The direct current circuit for exciting the field is closed through the elements indicated by the following numerals taken in order: 22—18—17—16—17—16—17—16—17—16—18—22. The main field coils 17 and screen ring coils 16 are connected in alternate series across the direct current brushes in one circuit.

By the arrangement herein provided direct current is fed normally to the switch contacts 30 and 31 by a circuit containing the following elements in order: 30—18—22—18—26—29—31; the current being delivered from the contacts 30 and 31 for any purpose which may be desired, as indicated by dotted lines.

Figure 2:
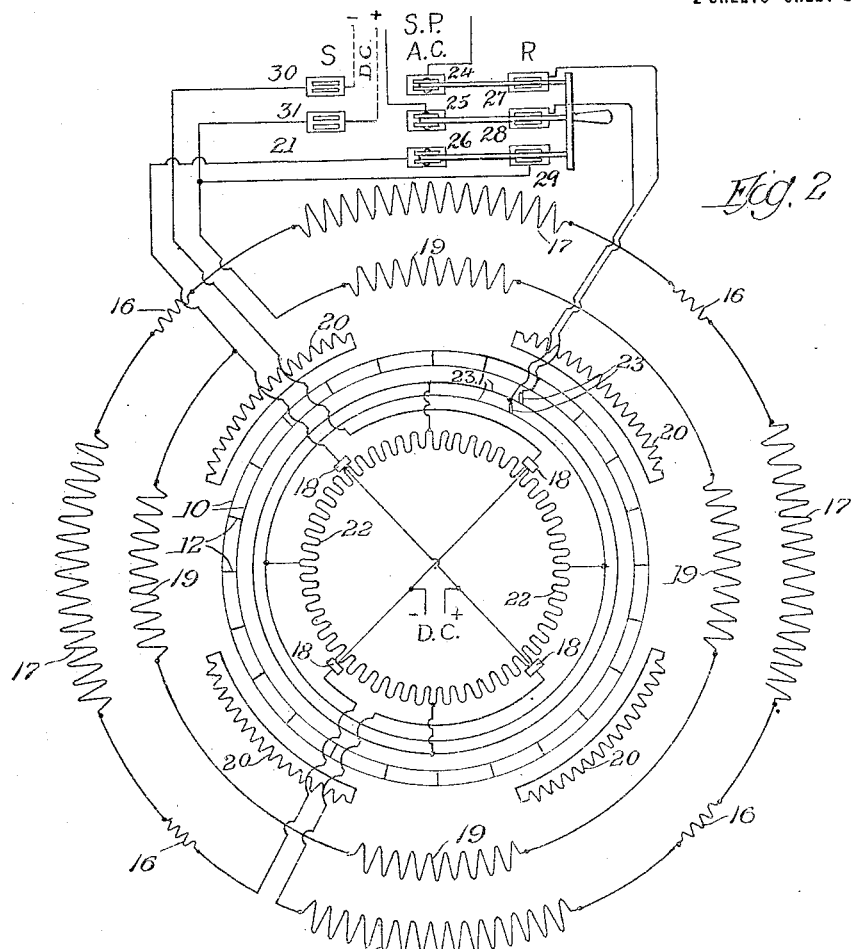
Fig. 2 is a diagram of the circuit connections with the windings shown in their relative angular position about the center or axis of symmetry.
Figure 3:
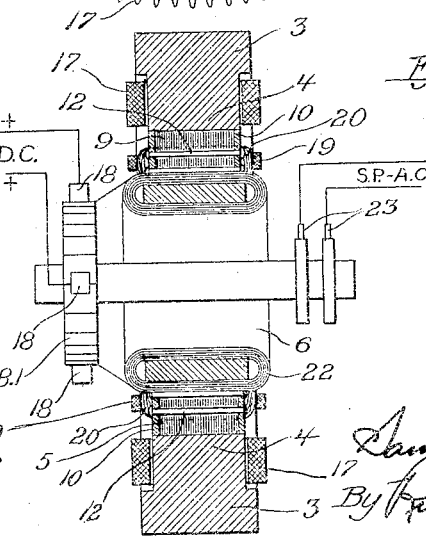
Fig. 3 is a longitudinal axial section through the field yoke, poles, and armature showing the relative position of the several parts.

When the machine is not in use the switch 21 is open. In starting the machine to run on alternating current, the switch 21 is thrown to the starting position, that is to the left on the drawings, then as soon as the machine comes up to synchronism the switch is thrown over to the running position, that is to the right on the drawings, whereby the power current is fed directly to the slip rings, and the direct current circuit is so connected as to provide for the supply of direct current for whatever purposes are desired, as for light and power and including field excitation, as best shown by Fig. 2. A switch 35 is preferably used for delivering direct current from the machine.

As above shown, when the current is first turned on by throwing the switch to the starting position, the armature windings are connected in shunt with the main field coils and screen ring coils. The greater part of the current, entering through the supplementary field coils 19, passes through the armature, and but little passes through the coils 16 and 17 because of their high resistance and self-inductance. As the armature and supplementary field windings are connected in series in starting the field and armature currents are in phase. Hence the machine is started substantially as a direct current series motor on alternating current, the field flux being generated chiefly by the supplementary or starting coils 19. The arrangement of the coils 19 on the screen is peculiarly advantageous for starting, as the greater part of the alternating magnetic flux induced thereby may take a short course of low reluctance through the screen rather than out through the yoke and main pole pieces proper. Thus in starting, the iron losses are small and a relatively strong field is immediately produced by the alternating current in the coils 19 without much current in the main shunt field coils 17 and without much flux generated in the yoke 3 and main pole cores 4.

As soon as the starting switch is thrown to the running position the rotating field developed in the armature reacts upon the squirrel cage, as in an induction motor, especially in case of overload, and thereby helps to steady the action of the machine.

While this invention applies to both single and polyphase machines, I have preferred to illustrate the same in its simplest form as applied to single phase machines.

This invention is an improvement over the device of my copending application Serial No. 716,407, filed August 22, 1912, wherein the magnetic screen comprises a series of polar projections corresponding with and disposed opposite the several main poles of the machine, with a winding space and supplementary poles between said polar projections, whereas the magnetic screen of the present invention is provided with a continuous and substantially uniform series of closely spaced slots and perforated teeth, with windings quite different in arrangement and use from those of the prior application.

Although but one specific embodiment of this invention is herein shown, it will be understood that numerous details of the construction shown may be altered or omitted without departing from the spirit of this invention, as defined by the following claims.

I claim:

1. In a device of the class described, an annular magnetic screen comprising a laminated core, in combination with a pair of electrically conductive annular clamping rings disposed on opposite sides of said screen and electrically conductive clamping bars for binding the laminations together between said plates, the laminations and plates being formed with a peripheral series of alternately arranged slots and perforated teeth substantially uniformly distributed, form windings spaced symmetrically on said screen in certain of said slots and connected in series, ring windings disposed in certain of said slots between the first mentioned windings, and closed form windings disposed in certain of said slots on opposite sides of said ring windings, and symmetrically overlapping the first mentioned windings, said bars being housed in said perforated teeth.

2. In a device of the class described, a field system of unitary character comprising a magnetic yoke, pole pieces thereon, and an annular magnetic screen having a peripheral series of closely spaced and substantially uniformly distributed slots and perforated teeth alternately arranged, in combination with electric windings disposed in said slots and teeth respectively.

3. In a device of the class described, a field system of unitary character comprising an annular magnetic screen having a peripheral series of uniformly spaced and transversely disposed slots of like character formed around its inner surface, in combination with a series of windings disposed in said slots.

4. In a device of the class described, an annular magnetic screen formed with an inner peripheral series of alternately disposed like teeth and like slots, in combination with damper windings and supplementary magnetizing coils symmetrically disposed within said slots.

5. In a device of the class described, a stationary frame formed with a peripheral yoke having inwardly projecting field poles thereon, an armature journaled concentrically within said poles, and a continuous magnetic screen disposed between said poles and said armature with a suitable air gap for clearance of the armature, said screen being formed with an inner peripheral series of uniformly spaced and alternately arranged teeth and slots, substantially as and for the purpose set forth.

6. In a device of the class described, an annular series of stationary field poles, an armature journaled to rotate concentrically within said poles, and a magnetic screen embraced rigidly by said poles and surrounding the armature, said screen having a continuous series of uniformly distributed transverse slots arranged around its inner surface.

7. In a device of the class described, an annular series of stationary poles, an armature journaled to rotate concentrically within said poles, a continuous annular damper disposed between said armature and poles, supporting means for said damper embraced rigidly by said poles, said supporting means being formed with a continuous series of uniformly spaced inwardly projecting teeth perforated transversely and said damper comprising substantially a pair of heavy conductor plates radially disposed and spaced apart transversely, and a series of transversely disposed conductor bars rigidly mounted in the tooth perforations and connecting said plates.

8. In a device of the class described, an annular series of stationary poles, an armature journaled to rotate concentrically within said poles, a ring member disposed between said poles and said armature and rigidly embraced by said poles, said ring member comprising a combined magnetic screen and electric damper consisting of a group of soft iron laminations disposed transversely of the axis in a radial direction, a pair of heavy conductor plates disposed on opposite sides of said group of laminations and a continuous series of uniformly spaced heavy conductor bars transversely disposed and arranged to clamp said laminations tightly between said plates, and said ring being formed with a peripheral series of inwardly projecting teeth perforated transversely of the ring for housing said bars.

9. In a device of the class described, an annular series of stationary poles, an armature journaled to rotate concentrically within said poles, an annular magnetic screen disposed between said poles and armature and rigidly embraced by said poles, said screen being provided with a substantially uniform annular series of slots disposed transversely on its inner side, supplementary field windings in said slots arranged to strengthen the adjacent fields respectively, and a source of alternating current connected to energize said poles and windings with alternating current.

10. In a device of the class described, an annular series of stationary poles, an armature journaled to rotate concentrically within said poles, an annular magnetic screen disposed between said poles and armature and rigidly embraced by said poles, said screen being provided with a series of similar slots uniformly distributed and disposed transversely on its inner side, and ring wound coils disposed in certain of said slots adapted to oppose flux leakage through said screen.

11. In a device of the class described, an annular series of stationarily mounted main poles uniformly distributed, an armature having both direct and alternating current brushes disposed to rotate within said poles and a screen ring rigidly embraced by said poles and disposed between the poles and the said armature, two sets of field windings disposed on the said poles and on the screen ring centrally between said poles respectively and connected in series between the direct current brushes, the latter or medial windings being ring wound.

12. In a dynamo electric machine the combination of a field frame having an annular series of inwardly projecting poles symmetrically spaced apart, an armature journaled to rotate concentrically within said field poles, a screen and damper constructed in combination as a ring disposed between the inwardly turned pole faces and the armature and stationarily held by the said poles, said ring having a series of alternately disposed teeth and slots on its inner side, said slots containing supplementary windings and said teeth being perforated and provided with conductors connected in squirrel cage arrangement.

13. In a device of the class described, an annular series of stationary poles, an armature journaled to rotate concentrically within said poles, an annular magnetic screen disposed between said poles and armature and rigidly embraced by said poles, said screen being provided with a continuous annular series of slots disposed transversely on its inner side, form wound supplementary field windings disposed in certain of said slots opposite the said poles, ring wound windings disposed in certain of said slots intermediate of said poles, and form wound damper windings arranged with opposite sides housed in certain of said slots opposite adjacent poles.

14. In a dynamo-electric machine a field member having projecting poles, an armature with a commutator and brushes therefor, a screen disposed between said armature and poles and fixed to the latter, shunt magnetizing windings for said field member connected across said brushes, and series supplementary magnetizing windings disposed upon said screen opposite said poles respectively.

15. In a dynamo electric machine, the combination of a field frame having an annular series of inwardly projecting poles symmetrically spaced apart and magnetizing means therefor, an armature adapted for both direct and alternating current journaled to rotate concentrically within said field poles, and a screen and damper constructed in combination as a ring disposed between the inwardly turned pole faces and the armature and stationarily held by the said poles, said ring having a series of alternately disposed teeth and slots on its inner side, certain of said slots containing supplementary windings disposed opposite said poles to strengthen the latter, and said teeth being perforated and provided with conductors connected in squirrel cage arrangement.

16. A device of the class described comprising in combination a field member with a pair of poles spaced apart, an armature having slip rings and a commutator with brushes therefor respectively, a screen disposed between said armature and poles, a shunt winding for said field member connected across the direct current brushes, and series windings disposed on said screen opposite said poles respectively, and having one side connected to one of the direct current brushes.

Signed at Chicago this 28th day of May, 1913.

SAMUEL H. MARTIN.

Witnesses:
PHILIP B. WOODWORTH,
FRED M. DAVIS.

Copies of this patent may be obtained for five cents each, by addressing the "Commissioner of Patents, Washington, D. C."